(12) United States Patent     (10) Patent No.:   US 12,591,455 B2

Kovetz et al.     (45) Date of Patent:   Mar. 31, 2026

(54) PARAMETER-BASED ADAPTIVE SCHEDULING OF JOBS

(71) Applicant: Dell Products L.P., Round Rock, TX (US)

(72) Inventors: Reut Kovetz, Tel Aviv (IL); Hana Schuster Smith, Boulder, CO (US); Janardan Revuru, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 426 days.

(21) Appl. No.: 18/303,681

(22) Filed: Apr. 20, 2023

(65) Prior Publication Data

US 2024/0354154 A1    Oct. 24, 2024

(51) Int. Cl.
    *G06F 9/48*       (2006.01)
    *G06F 11/14*      (2006.01)
    *G06F 11/1446*    (2026.01)

(52) U.S. Cl.
    CPC ........ *G06F 9/4881* (2013.01); *G06F 11/1461* (2013.01); *G06F 2201/84* (2013.01)

(58) Field of Classification Search
    None
    See application file for complete search history.

(56) References Cited

U.S. PATENT DOCUMENTS 8,423,731 B1 * 4/2013 Nadathur ............ G06F 11/1461
                                    711/111
10,089,144 B1 * 10/2018 Nagpal ............... G06F 16/2455

11,227,222 B2 * 1/2022 Vishwakarma ..... G06F 11/0727
2007/0106713 A1 * 5/2007 Allen .................. G06F 11/1448
2008/0154979 A1 * 6/2008 Saitoh ................ G06F 11/1464
2009/0113435 A1 * 4/2009 Mizrachi ............ G06F 11/1461
                                    718/102
2013/0262925 A1 * 10/2013 Dhanalakoti ....... G06F 11/1461
                                    714/16
2013/0290265 A1 * 10/2013 Hari ..................... G06F 16/113
                                    707/654
2017/0132089 A1 * 5/2017 Roehrsheim .......... G06F 16/113

(Continued)

OTHER PUBLICATIONS

Apricorn, "Over Fifty Percent of U.S. and UK Poll Respondents Have Experienced a Data Loss Due to Inadequate Backup Procedures," Oct. 12, 2021, https://www.prnewswire.com/news-releases/over-fifty-percent-of-us-and-uk-poll-respondents-have-experienced-a-data-loss-due-to-inadequate-backup-procedures-301398028.html.

(Continued)

*Primary Examiner* — Charles E Anya
(74) *Attorney, Agent, or Firm* — Amin, Turocy & Watson, LLP

(57) ABSTRACT

The technology described herein is directed towards automated generation of an efficient job (e.g., data backup job) schedule based on input provided by an administrator. A precheck is performed, prior to running scheduled jobs, based on variable data. The precheck alerts of predicted problems such as possible job failures, which can be remediated manually or via automation prior to running the jobs, and thereby increases the success rate with respect to running a job. At the time of running jobs, the technology considers real-time events and can adjust the running time, schedules, etc. Real time detection of asset inactivity/idle time can be used to host jobs at times other than traditional off-peak hours, and thereby extend the operating window for running jobs.

20 Claims, 11 Drawing Sheets

(56) References Cited

U.S. PATENT DOCUMENTS

| | | | | |
|---|---|---|---|---|
| 2018/0316577 | A1* | 11/2018 | Freeman | H04L 41/5009 |
| 2021/0049074 | A1* | 2/2021 | Bezerra Maimoni | |
| | | | | G06F 11/1461 |
| 2021/0182154 | A1* | 6/2021 | Liao | G06F 11/1469 |
| 2021/0240575 | A1* | 8/2021 | Mulheren | G06F 11/1456 |
| 2021/0397474 | A1* | 12/2021 | Srinivasan | G06F 9/4887 |

OTHER PUBLICATIONS

Veeam, "CXO Research: 58% of Data Backups are Failing, Creating Data Protection Challenges and Limiting Digital Transformation Initiatives," Mar. 18, 2021, https://www.veeam.com/news/cxo-research-58-percent-of-data-backups-are-failing-creating-data-protection-challenges-and-limiting-digital-transformation-initiatives.html.
Kostos, "World Backup Day: 2019 Survey Results," Mar. 26, 2019, https://www.acronis.com/en-us/blog/posts/world-backup-day-2019-survey-results/.
Krstic, "15+ Scary Data Loss Statistics to Keep in Mind in 2022," Apr. 6, 2022, https://hostingtribunal.com/blog/data-oss-statistics/#gref.
Smith, "The Cost of Lost Data," Graziadio Business Review, 2003 vol. 6 Issue 3, https://gbr.pepperdine.edu/2010/08/the-cost-of-lost-data/.

* cited by examiner

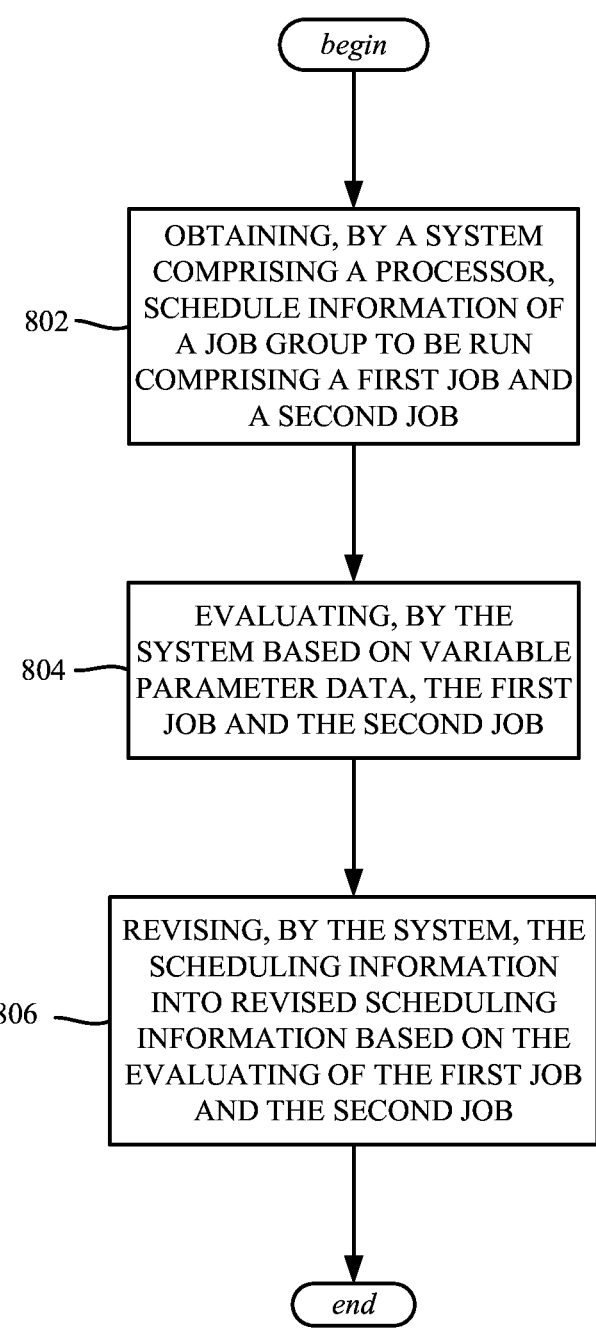

begin

802 — OBTAINING, BY A SYSTEM COMPRISING A PROCESSOR, SCHEDULE INFORMATION OF A JOB GROUP TO BE RUN COMPRISING A FIRST JOB AND A SECOND JOB

804 — EVALUATING, BY THE SYSTEM BASED ON VARIABLE PARAMETER DATA, THE FIRST JOB AND THE SECOND JOB

806 — REVISING, BY THE SYSTEM, THE SCHEDULING INFORMATION INTO REVISED SCHEDULING INFORMATION BASED ON THE EVALUATING OF THE FIRST JOB AND THE SECOND JOB end

FIG. 8

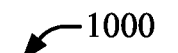
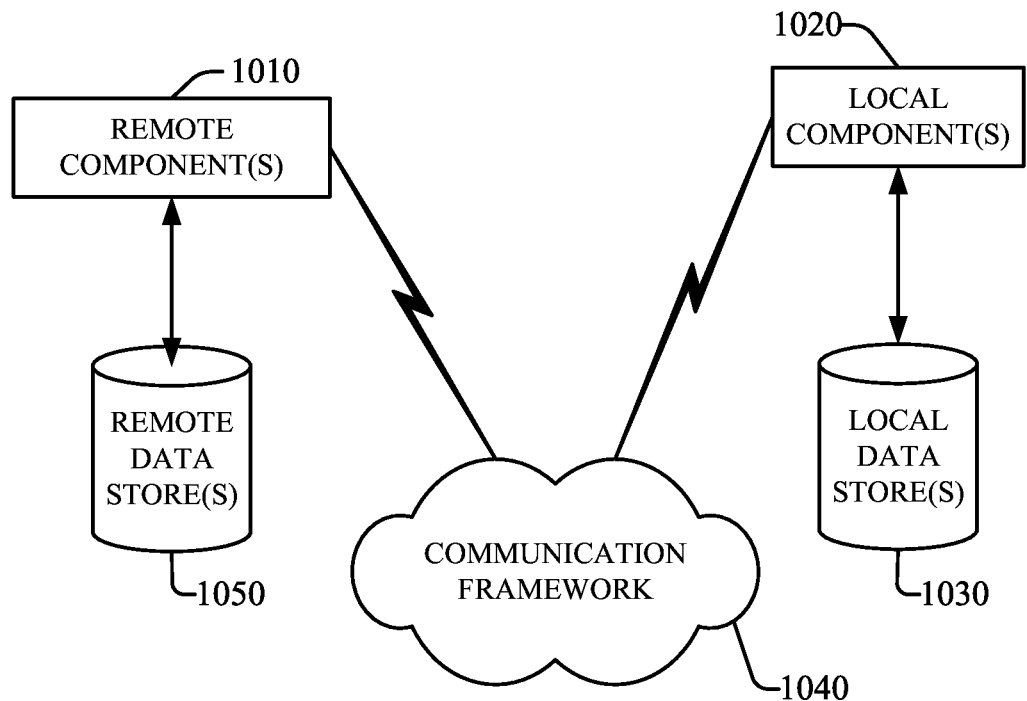
FIG. 10

PARAMETER-BASED ADAPTIVE SCHEDULING OF JOBS

BACKGROUND

Data storage is growing at an exponential rate (estimated soon to be on the order of zettabytes). In numerous scenarios, stored data needs to be protected, managed and backed up. Often, the amount of data processing needed outpaces the ability for data users (e.g., enterprise customers) to align infrastructure resources. In addition, the complexity of manually scheduling and managing the data makes the process of protecting data more error prone.

Considering data backup, human error is among the reasons for backup failures, often cited as causing about half of the backup failures in various environments. The backup and archival of data is performed by backup administrators, typically by manually scheduling backup jobs during non-peak hours of datacenter operations, to keep the impact low on main business operations (host time). Administrators schedule assets that need to be backed up, and coordinate the assets, network bandwidth, storage targets, and the like. The backup operations happen periodically and are monitored during and after running by backup administrators through dashboards, job monitoring pages and alerts.

However, with the exponential increase in data and less off-peak time due to more continuous business operations, scheduling of backup jobs is becoming more complicated, with a generally narrow time window that is often not sufficient to complete the backup operations. As data management requirements become more complex, such as based on service level objectives and service level agreements (SLA/SLOs, which can have fiscal penalties if not met), backups are becoming increasingly more error prone.

Backup failure means that data is unprotected; therefore, enterprises need reliable backup solutions with a high success rate to protect their data. However, scheduling backups and troubleshooting failures is cognitively taxing, time consuming, and costly.

BRIEF DESCRIPTION OF THE DRAWINGS

The technology described herein is illustrated by way of example and not limited in the accompanying figures in which like reference numerals indicate similar elements and in which:

FIG. 8 is a flow diagram showing example operations related to revising job scheduling information based on evaluating variable parameter data, in accordance with various aspects and implementations of the subject disclosure.

FIG. 10 is a block diagram representing an example computing environment into which aspects of the subject matter described herein may be incorporated.

DETAILED DESCRIPTION

Figure 1:
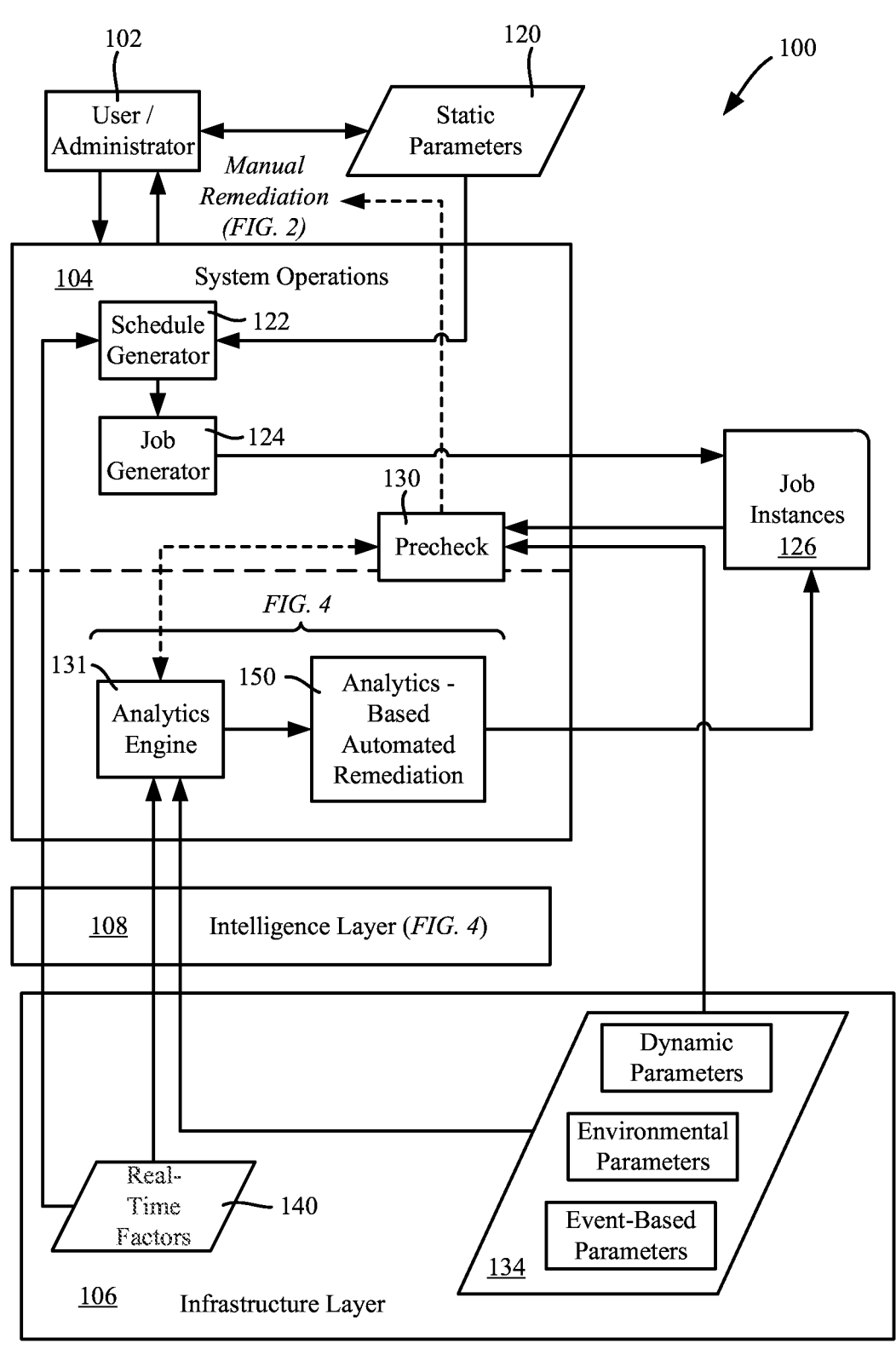
FIG. 1 is a block diagram representation of a system/architecture in an environment for running data-related (e.g., data backup) jobs, in accordance with various aspects and implementations of the subject disclosure.

Various aspects of the technology described herein are generally directed towards scheduling jobs, including backup jobs, based on backup administrator-provided input and dynamic parameters to meet required conditions and optimize the number of jobs and their success rate. Among other benefits, the technology described herein reduces or even eliminates the manual and inefficient scheduling of backup jobs and more optimally utilizes resources in a datacenter. In addition, a backup administrator is alerted ahead of time when certain datasets cannot be protected in a way that meets configured criteria.

In one or more implementations as described herein, various levels of automation are described, including alerting based on a precheck of scheduled jobs to notify a backup administrator of jobs that require intervention/remediation; this increases the job or job success rate. The technology described herein can suggest job schedules that can be reviewed/altered by the administrator, thus allowing control for optimizing the scheduling window to meet business needs. Further, an analytics engine can be used to more fully automate the adaptive scheduling of jobs, which in general reduces operational costs and optimizes the scheduling window.

It should be understood that any of the examples herein are non-limiting. As one example, the technology is mostly described with respect to an example data backup job/backup environment, however this is only an example and the technology can be implemented for other types of jobs, including data handling or data processing in general, and/or in other environments. Thus, any of the embodiments, aspects, concepts, structures, functionalities or examples described herein are non-limiting, and the technology may be used in various ways that provide benefits and advantages in data storage and computing in general. It also should be noted that terms used herein, such as "optimization," "optimize" or "optimal" and the like (e.g., "maximize," "minimize" and so on) only represent objectives to move towards a more optimal/maximal state, rather than necessarily obtaining ideal results.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows an example environment 100 in which various aspects of the technology described herein can be implemented, e.g., in a network environment in which data-related jobs and/or other jobs are run, such as data management jobs. In general, data management refers to the process of ingesting, storing, organizing and maintaining the data created and collected by an organization. Data management is significant with respect to advancements in analytics, data privacy and data protection laws and regulations.

In FIG. 1, a user/administrator 102 reviews and/or sets static parameters 120 based on a desired policy, e.g., a backup job policy. In a backup job example, system operations (block 104) include a schedule generator 122 and job generator 124 that schedule backup job instances 126 based on backup administrator 102 provided input (including the static parameters 120), along with dynamic, environmental, and event-based parameters (block 134) of an infrastructure layer 106. The parameters are used in a way that can help meet required conditions, optimize the number of jobs, and optimize their success rate. In a data backup environment, a job instance as generally used herein is one instance of a backup schedule series, (the schedule is the series, an instance is the single job therein).

Other data protection jobs may similarly benefit from the technology described herein, where in general, data protection refers to the process of safeguarding data, mainly from corruption, compromise or loss by making copies of that data. Data protection is complicated to manually schedule and execute successfully, as it requires balancing different operations that rely on variables, inputs, dependencies (like network throughout), a fixed number of network resources, while complying with protection policy. In general, protection policy refers to a set of data (typically manually input by a customer (e.g., a backup administrator)) processed against a series of objectives (number of copies, retention time, etc.) executed on a backup schedule, which generate a job series that has many job instances. A job instance is basically thus a single backup activity (e.g., primary copy, replication, snapshots, retention (deletion of copies)) that represents part of a sequence of job tasks. Each task is a data protection operation; e.g., in full backup of a host, each virtual machine on the host is a task. A backup schedule defines a schedule to perform capture various types of copies (e.g., primary copy, replicate copy disaster recovery, etc.), for a variety of asset types such as files, virtual machines, databases and the like, typically performed during off-peak (non-hosting, non-business) hours. As will be understood, the technology described herein removes the manual and inefficient scheduling of backup jobs, and more optimally utilizes resources in a datacenter.

As also shown in FIG. 1, a precheck 130 is performed to evaluate the job instances 126 as described herein, including with respect to the variable parameters 134, prior to running the jobs. As described herein, the system has information about dynamic, environmental and event-based parameters, including those that change frequently or constantly (e.g., network bandwidth, assets availability, success rate history, etc.), which can otherwise lead to a job failure. In this way, the backup administrator is alerted ahead of time when certain datasets cannot be protected to meet configured criteria. The precheck component 130 can output alerts and the like to the user/administrator 102 for manual remediation, e.g., as generally described with reference to FIG. 2. The alerting by the precheck of scheduled jobs notifies the backup administrator of jobs that require intervention/remediation before the job is run, which increases backup success rate. Capturing failed jobs or uncompleted jobs after the fact is too late, and can mean that data is already unprotected. The technology described herein prevents possible data loss and monetary costs incurred by existing solutions that only alert post-operation/post-failure; backup failures can be associated with data loss, regulatory violations, fiscal penalties, and the like.

In one implementation (generally described with reference to FIG. 4), the precheck component 130 can be part of an analytics engine 131 for automated remediation (block 150), or when not possible or not desired, also can alert the user/administrator 102 for manual remediation. In this analytics-based implementation, real time factors as well as the variable parameters 134 are received by the analytics engine 131 and/or the schedule generator 104 via an intelligence layer 108 that separates permanent factors from dynamic factors. In general, the analytics engine 131 automates the adaptive scheduling of jobs, which reduces operational costs and optimizes a scheduling window. The analytics engine 131 also can suggest job schedules that can be reviewed/altered by the administrator, providing control and optimizing the scheduling window to meet business needs.

Because of real-time data collection, the technology described herein can overcome the limitation of a narrow backup window, which does not scale to meet the ever-growing data that needs to be protected, by allowing jobs to run at other times. For example, if resources are available during peak business hours, such a situation can be detected in real time and a job can be run at that time, at least in part.

Figure 2:
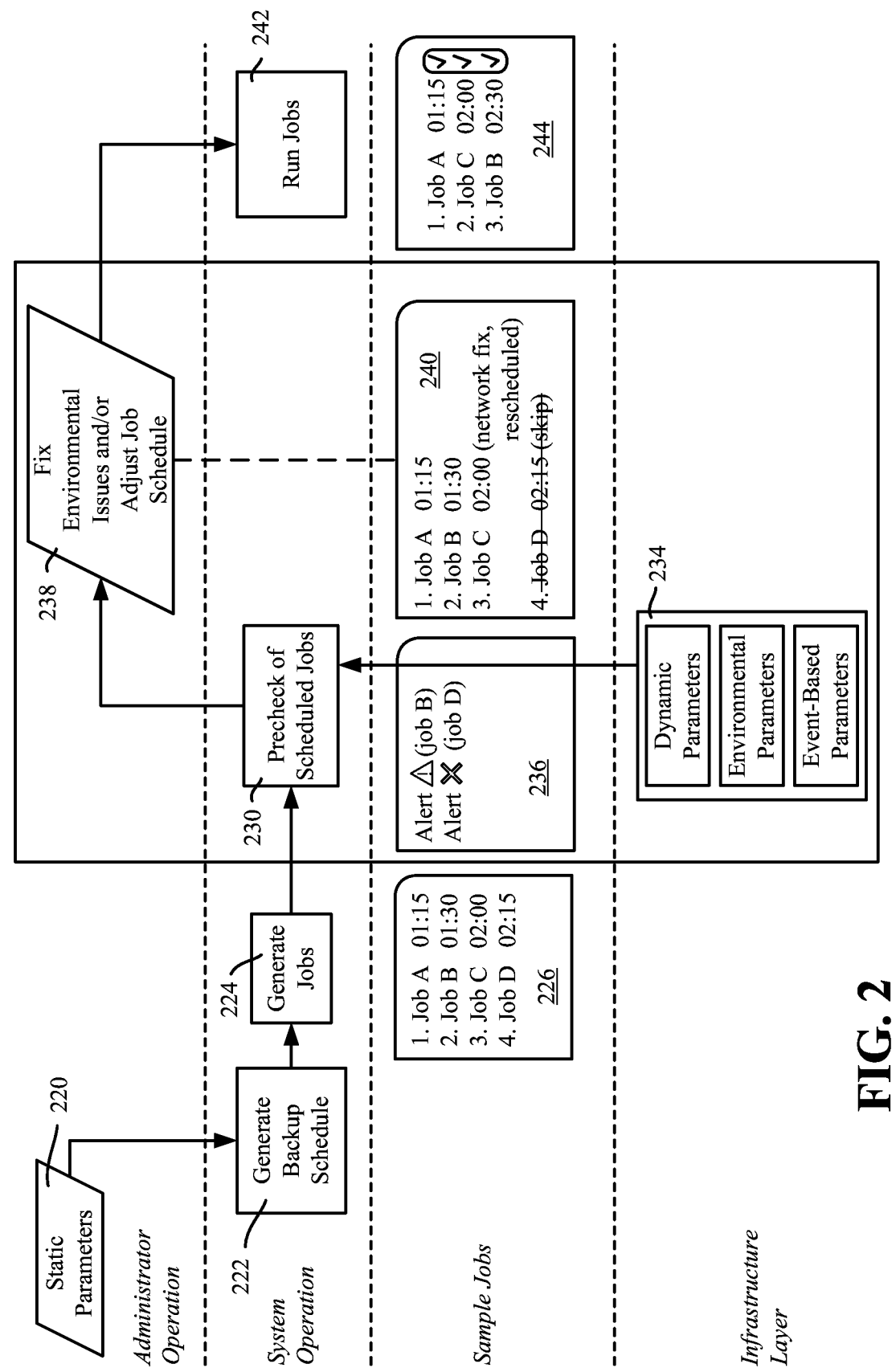
FIG. 2 is a is a block diagram and workflow sequence diagram showing a job being generated and checked before running for possible remediation, in accordance with various aspects and implementations of the subject disclosure.

FIG. 2 shows how a job can be generated based on static parameters. In this example, a backup administrator inserts/selects via a suitable user interface static parameters 220 to configure a backup policy. Example static parameters 220 with respect to a backup job can include, but are not limited to, frequency of backup, e.g., daily, weekly, monthly, type of backup, e.g., incremental, full, smart, mixed (daily incremental backup, weekly full backup), number of copies, dataset-related, e.g., importance of data that needs to be backed up, and service level agreement/service level objective back-up protection objectives. There is also an automation parameter by which an administrator can specify "do not automate" or the like, whereby the backup policy is managed manually. The backup administrator can further input information such as including, but not limited to, the value of data, constraints such as time of day, compliance requirements, and so forth. Input criteria often can be defined by compliance and priority during initial configuration. During job reprioritization these inputs can be used for adaptive scheduling (shifting of jobs, starting of job immediately after completion of previous activity eliminating downtime on the network, and possibly skipping a job if an asset still adheres to SLA/SLOs; (e.g., sufficient up-to-date backup copies already exist)).

As shown in FIG. 2, to generate a backup schedule, in one example implementation a backup policy schedule is created (block 222) based on the static parameters 220 received, e.g., at the system operation level. A backup application (block 224) generates job instances 226 based on the backup schedule generated via block 222.

As described herein, a precheck (block 230) of the scheduled jobs 226 is performed, which in one implementation facilitates manual user intervention to fix the job schedule. When performed, the precheck of scheduled jobs takes as input various parameters (dynamic, environmental and/or event-based parameters) 234 and, as needed, recommends an optimization and/or alerts (block 236) on needed remediation to attempt to maximize the overall jobs' success rate. More particularly, the precheck 230 includes validating resources such as network, source/client systems, storage targets, other job schedules, planned downtime, known outages, custom calendar(s), and the like. Note that the precheck functionality can be implemented as a standalone feature prior to adaptive scheduling to minimize failures.

The frequently changing varying parameters 234 can include, but are not limited to, system health, network bandwidth, switch health, performance metrics, ability to detect if an asset is in use (e.g., CPU utilization), storage capacity, back up time and so forth. This provides the ability to detect and map asset activity. By leveraging this data, some assets can be backed up based on resource availability during business hours. Accessing and using this data (e.g., the dynamic parameters) to run backups (adaptive scheduling) during peak business hours for non-active data sets/assets, can allow the technology to bypass hard rules for specific time or frequency. This leaves more time (increases the margin of safety in a standard backup window) for critical assets, reducing the risk of failing to perform critical asset backups.

The backup administrator can then review the recommended job instances schedule and adjust (block 238) job instances based on the remediation and/or alerts. If some revision was needed, when the revised job schedule 240 is run (block 242), the result is a higher success rate (block 244) in successful job completion.

Figure 3:
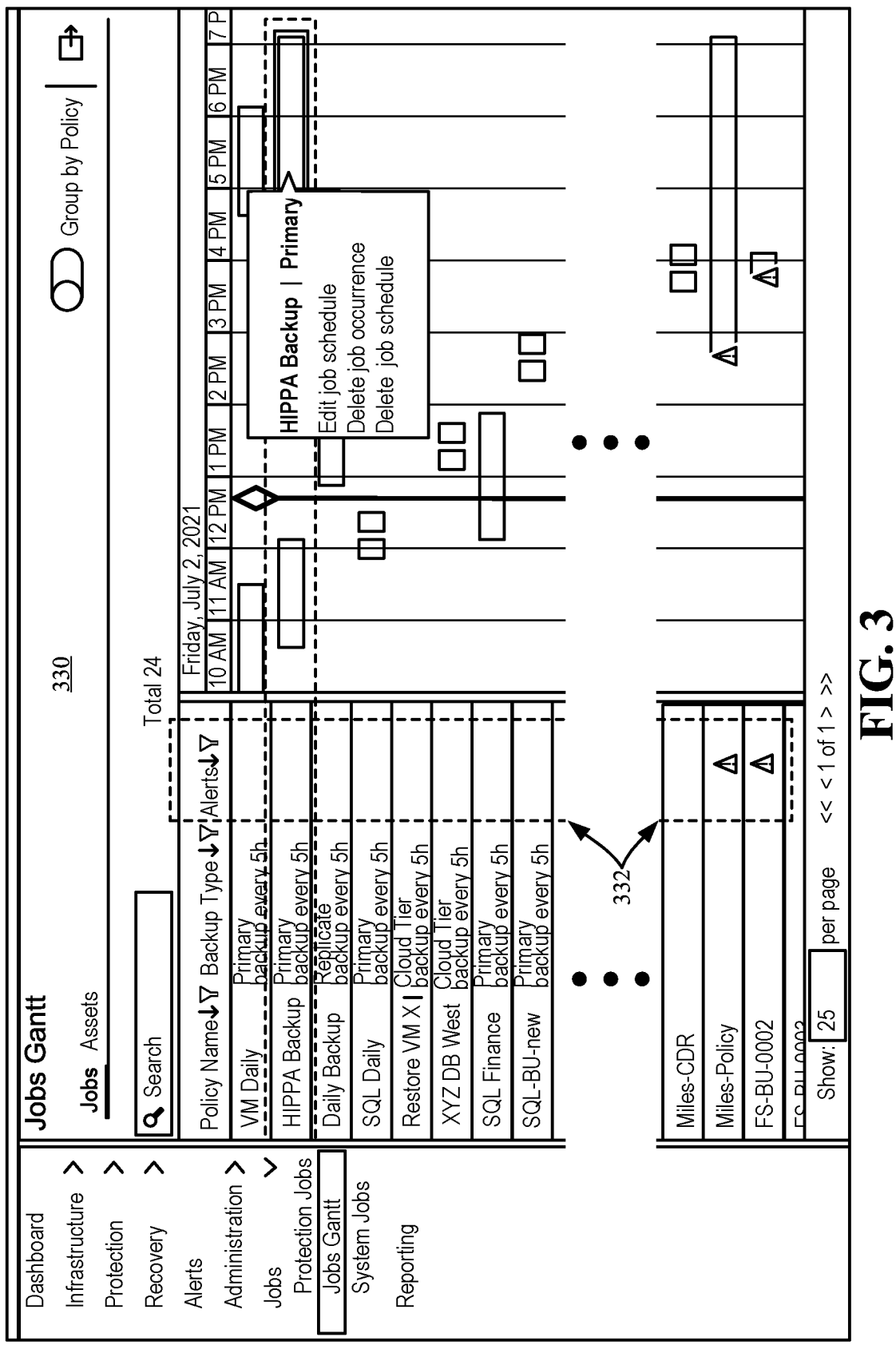
FIG. 3 is a representation of an example user interface, including output information by which an administrator can be alerted with respect to job instances, in accordance with various aspects and implementations of the subject disclosure.

As shown via the example user interface 330 of FIG. 3, for job instances that cannot run for various reasons (e.g., increasing target storage capacity is needed, but doing so requires customer permissions/intervention), the system alerts ahead of runtime to prevent failure, as represented via the two alerts (warning icons, depicted as triangles with exclamation ("!") points inside) in dashed block 332. This is significant because backup failures can be associated with data loss, regulatory violations, fiscal penalties, and the like. Although not explicitly depicted in FIG. 3, the rectangular bars representing jobs executed over a date and timeframe can be color coded or otherwise visibly altered to indicate the type of job, job status, or for other indications.

To summarize, the technology described with reference to FIGS. 2 and 3 includes the "precheck of scheduled jobs" operation after job instances are generated, but before they run at the scheduled time. Precheck 230 takes the input various parameters 234 and generates alerts and recommends one or more remediation actions (e.g., an optimized job instances schedule for maximum protection (i.e., maintaining SLA/SLOs)) to maximize jobs success rate. The backup administrator can then review the recommended job instances schedule and adjust job instances based on the precheck engine's recommended schedule.

Figure 4:
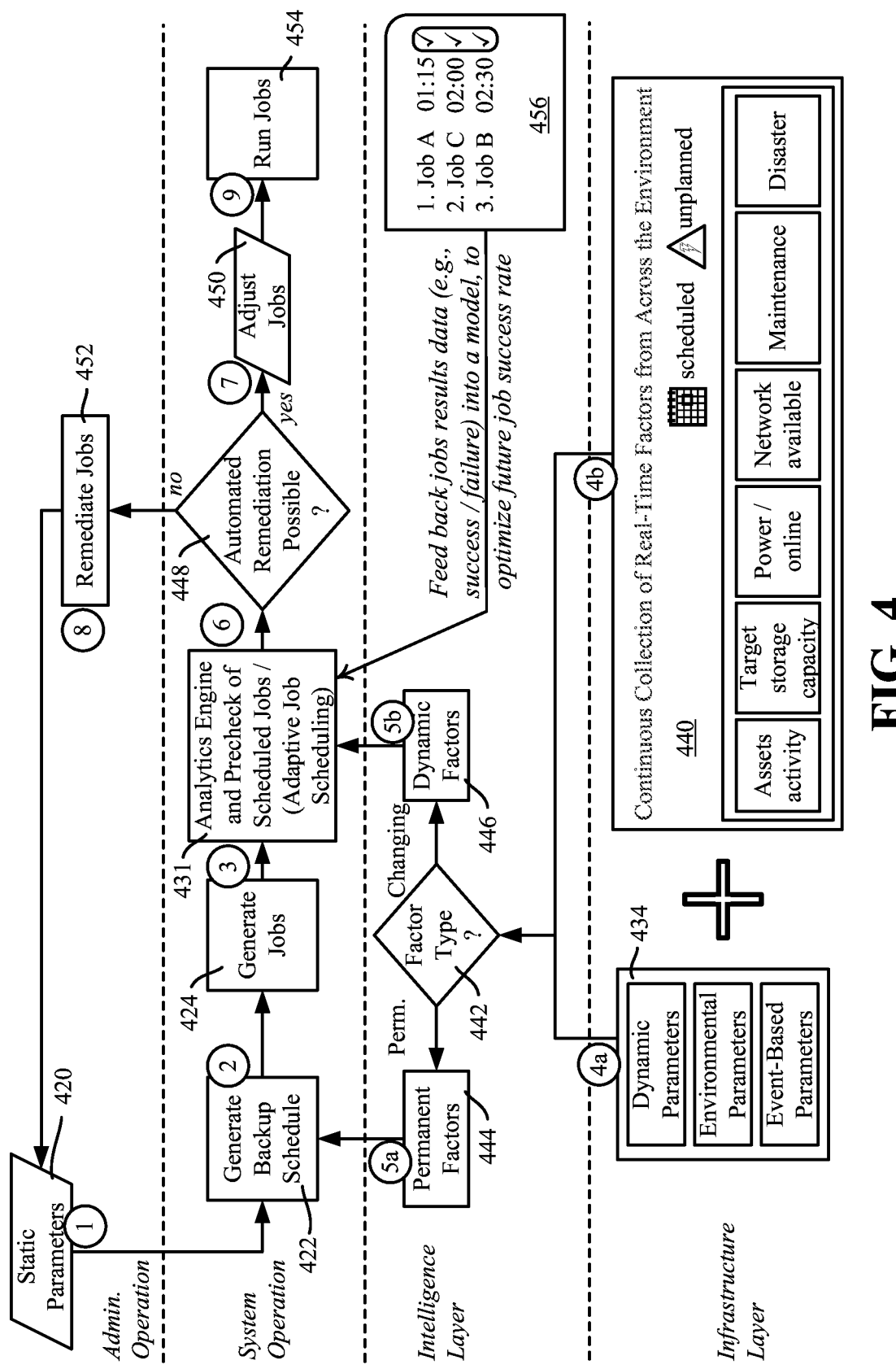
FIG. 4 is a block diagram and workflow sequence diagram showing a job being generated, analyzed and adjusted/scheduled based on administrator SLAs and infrastructure conditions, in accordance with various aspects and implementations of the subject disclosure.

In one example implementation, generally represented in FIG. 4, a further level of automation is provided, including an analytics engine and adaptive job scheduling based on administrator SLAs and infrastructure conditions. In general, the analytics engine plus the adaptive job scheduling is based on administrator SLAs (and infrastructure conditions), whereby the analytics engine attempts to use the least amount of resources while keeping SLA requirements, considering network bandwidth, assets availability, success rate history and the like. The analytics engine can employ artificial intelligence/machine learning, which can be trained on existing job results, and updated as new results are obtained over time.

As with FIG. 2, to generate a backup schedule, a backup policy schedule is created (block 422) based on the static parameters 420 received from the administrator, as indicated in FIG. 4 by circled numerals one (1) and two (2). A backup application (block 424) generates job instances 426, as represented by circled numeral three (3).

In this example implementation, an analytics engine 431 is present, which collects the dynamic, environmental, and event-based parameters 434 being fed into the system and performs the precheck operations as described above, as represented in FIG. 4 via circled numeral (4a). In general, these parameters can include, but are not limited to, the same set of parameters 434 as described with reference to FIG. 2. That is, dynamic parameters can include, but are not limited to volume of data to be backed up (delta changes), network bandwidth, system health (with critical alerts, warnings— e.g., hardware failures, which need a longer period to fix), system load pattern (monitor activity versus idle states), and availability (whether an asset is online). Environmental/unplanned parameters can include, but are not limited to hosting assets' performance limits, natural events (e.g., a hurricane), and data center conditions (e.g., high temperature). Event/schedule-based parameters can include, but are not limited to, custom calendar data indicating downtime schedules, and a calendar with business events (e.g., quarterly all-hands, Black Friday sale, and so on).

Further, as represented by circled numeral (4b), also fed into the system is a (generally) continuous group of real-time factors 440 collected from across the overall environment. As depicted in FIG. 4, this data can include, but are not limited to scheduled and unplanned data, including assets activity data, target storage capacity data, power/online state data, network availability data, maintenance-related data, or disaster-related data.

An intelligence layer processes the parameters 434 and real-time factors, via a decision block 442 that separates permanent factors 444 from dynamic factors 446. The dynamic factors 446 are fed into the analytics engine and precheck (block 431, and circled numeral (5a)) and the permanent factors 444 are fed into the backup schedule generator 422 (circled numeral (5b)), e.g., to adjust the recurrence of the jobs.

As represented in FIG. 4 via circled numeral six (6), along with the analytics engine and precheck of scheduled jobs (at block 431), the analytics engine generates an optimized job instances schedule, which can be generated for maximum protection (e.g., maintaining SLA/SLOs) to maximize the jobs' success rate. The jobs can be adjusted (block 450) via automated adjustment and remediation of the jobs schedule as represented via circled numeral seven (7). Any schedule adjustments are within the defined policy SLAs.

Figure 5:
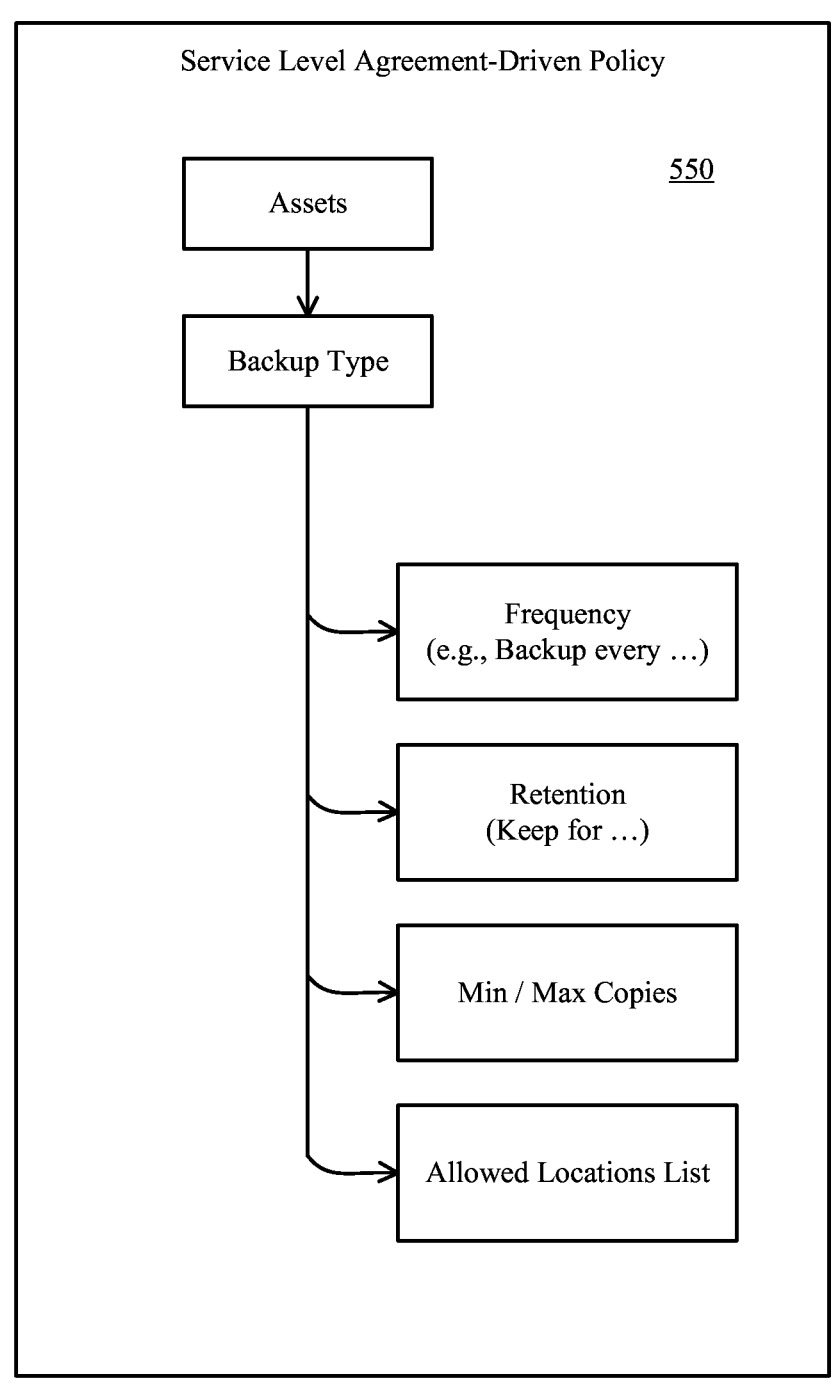
FIG. 5 is a representation of example service level agreement-driven policy considerations, in accordance with various aspects and implementations of the subject disclosure.
Figure 6:
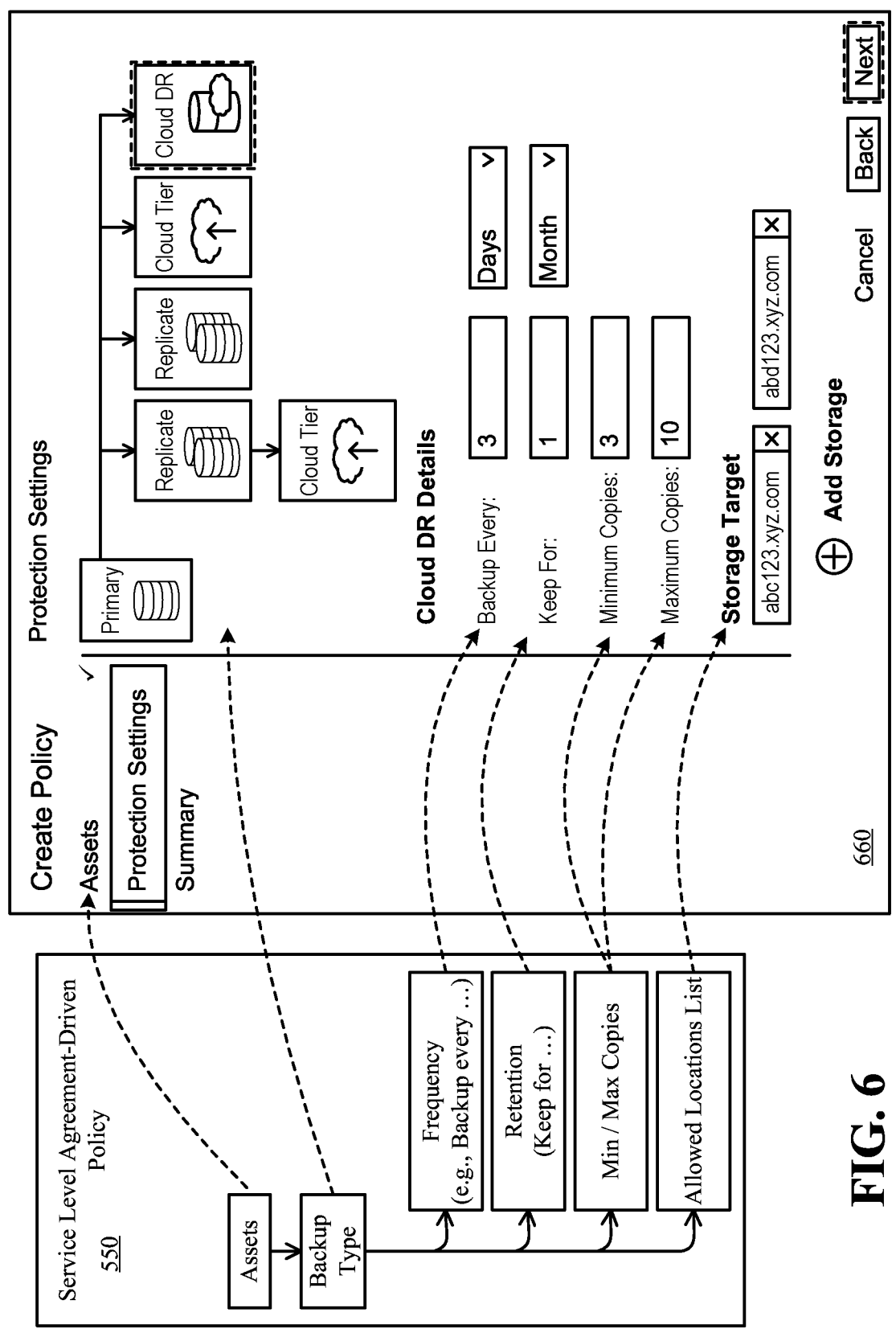
FIG. 6 is a representation of an example user interface by which static parameter data can be entered to correspond to policy, in accordance with various aspects and implementations of the subject disclosure.

As generally depicted in FIGS. 5 and 6, the analytics engine and adaptive job scheduling described herein can be based on administrator SLAs and infrastructure conditions 550. As can be seen in the example user interface 660 of FIG. 6, the service level agreement-driven policy 550 can be mapped to and controlled via such a user interface 660, with which an administrator can interact to match desired policy. For example, as shown in FIG. 6, the administrator has selected protection settings for cloud DR (disaster recovery; primary, cloud tier or replicate can also be selected), with the desired policy considerations (generally shown in the policy 550) mapped to interactive data entry/selection controls in the interface 660. Note that policy parameters can be updated to adjust to configuration changes in infrastructure.

Returning to FIG. 4, if the analytics engine 431 identifies unresolvable items (decision block 448), the engine 431 generates alerts (e.g., as in FIG. 3 which shows an example representation of jobs alerts) prior to the job instances running, so the administrator can intervene/remediate (block 450) the jobs and problems and prevent the job failures (circled numeral eight (8)). Indeed, by combining the analytics engine with adaptive scheduling, in this implementation the user need only be alerted when manual remediation is needed to mitigate failure, e.g., target storage is at capacity and does not have pool resources to extend capacity to meet a job demand. Pre-alerts can be provided for problem remediation, such as recommending purchasing/licensing/freeing up more storage.

Circled numeral nine (9) and block 454 represent running the jobs based on the schedule, e.g., derived by algorithm input. Job instances are performed, and results are captured. As shown in FIG. 4, the results can be fed back into the analytics engine 431 and/or other model for post-analysis and/or further artificial intelligence/machine learning training or the like.

Figure 7:
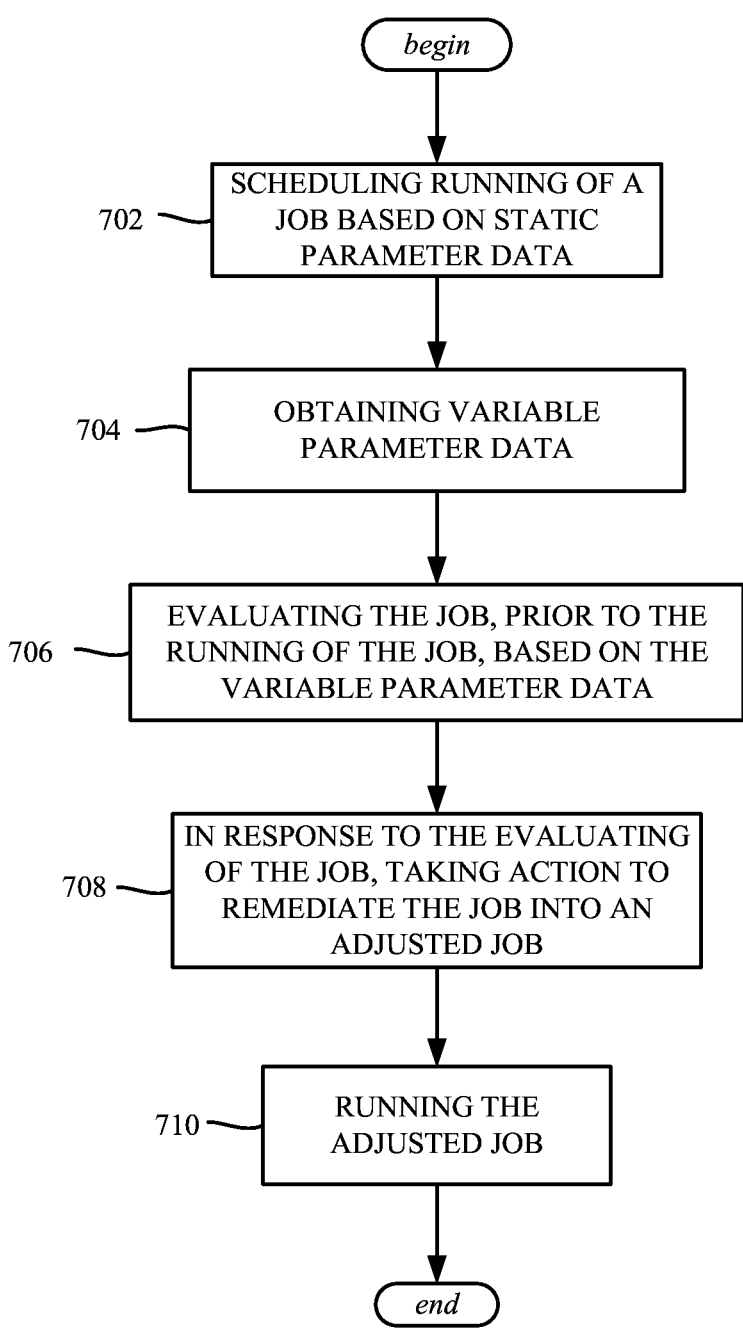
FIG. 7 is a flow diagram showing example operations related to remediating a job based on evaluating variable parameter data prior to running the job, in accordance with various aspects and implementations of the subject disclosure.

One or more aspects can be embodied in a system, such as represented in the example operations of FIG. 7, and for example can include a memory that stores computer executable components and/or operations, and a processor that executes computer executable components and/or operations stored in the memory. Example operations can include operation 702, which represents scheduling running of a job based on static parameter data. Example operation 704 represents obtaining variable parameter data. Example operation 706 represents evaluating the job, prior to the running of the job, based on the variable parameter data. Example operation 708 represents, in response to the evaluating of the job, taking action to remediate the job into an adjusted job. Example operation 710 represents running the adjusted job.

Taking the action to remediate the job into the adjusted job can be performed based on result data determined by an analytics engine.

Further operations can include obtaining job execution information with respect to the running of the adjusted job, and providing the job execution information to a model to increase a success rate of job execution.

The variable parameter data can include data such as at least one of, but not limited to: dynamic parameter data, environmental parameter data or event-based parameter data.

The variable parameter data can include at least one of: asset-related data, storage capacity data, power data, network condition data, maintenance data or disaster-related data.

The variable parameter data can include at least one of: an amount of data to be processed, network bandwidth data, system health data, system load condition data, or asset availability data.

The variable parameter data can include at least one of: hosting performance limit data of an asset, natural event data or datacenter condition data.

The variable parameter data can include at least one of: schedule-based data or calendar data.

The job can be a data backup job, and the static parameter data can include at least one of: backup frequency data, backup type data, number of backup copies data, priority information of data to back up, service level agreement data or service level objective data.

The adjusted job can be a first job, the variable parameter data can be first variable parameter data, and further operations can include scheduling a second job based on the static data, obtaining second variable parameter data, evaluating the second job, prior to running the second job, based on the second variable parameter data, and in response to the evaluating of the second job, canceling the running of the second job.

The adjusted job can be a first job, the variable parameter data can be first variable parameter data, and further operations can include scheduling a second job based on the static parameter data, obtaining second variable parameter data, evaluating the second job, prior to running the second job, based on the second variable parameter data, and in response to the evaluating of the second job, outputting an alert prior to the running of the second job.

Further operations can include receiving information in response to the outputting of the alert, in response to the receiving of the information, taking action based on the information to remediate the second job into a second adjusted job prior to the running of the second job, and running the second adjusted job as the second job.

The adjusted job can be a first job, the variable parameter data can be first variable parameter data, and further operations can include scheduling a second job based on the static parameter data, obtaining second variable parameter data, evaluating the second job, prior to running the second job, based on the second variable parameter data, and in response to the evaluating of the second job, rescheduling the running of the second job.

The adjusted job can be a first job, the variable parameter can be is first variable parameter data, and further operations can include scheduling a second job based on the static parameter data, obtaining second variable parameter data, evaluating the second job, prior to running the second job, based on the second variable parameter data, and in response to the evaluating of the second job, adjusting a running time associated with the running of the second job.

One or more example aspects, such as corresponding to example operations of a method, are represented in FIG. 8. Example operation 802 represents obtaining, by a system comprising a processor, schedule information of a job group to be run comprising a first job and a second job. Example operation 804 represents evaluating, by the system based on variable parameter data, the first job and the second job. Example operation 806 represents revising, by the system, the scheduling information into revised scheduling information based on the evaluating of the first job and the second job.

Revising the schedule information can include at least one of: remediating the first job into an adjusted job, canceling the second job, shifting the relative running order of the first job and the second job, or changing a start time for running the first job.

Further operations can include at least one of: outputting, by the system, an alert associated with the first job, or modifying, by the system, an amount of resources planned for running the first job.

Further operations can include obtaining, by the system, job execution information with respect to running the first job, and outputting, by the system, the job execution information to a model to increase a success rate of job execution.

Figure 9:
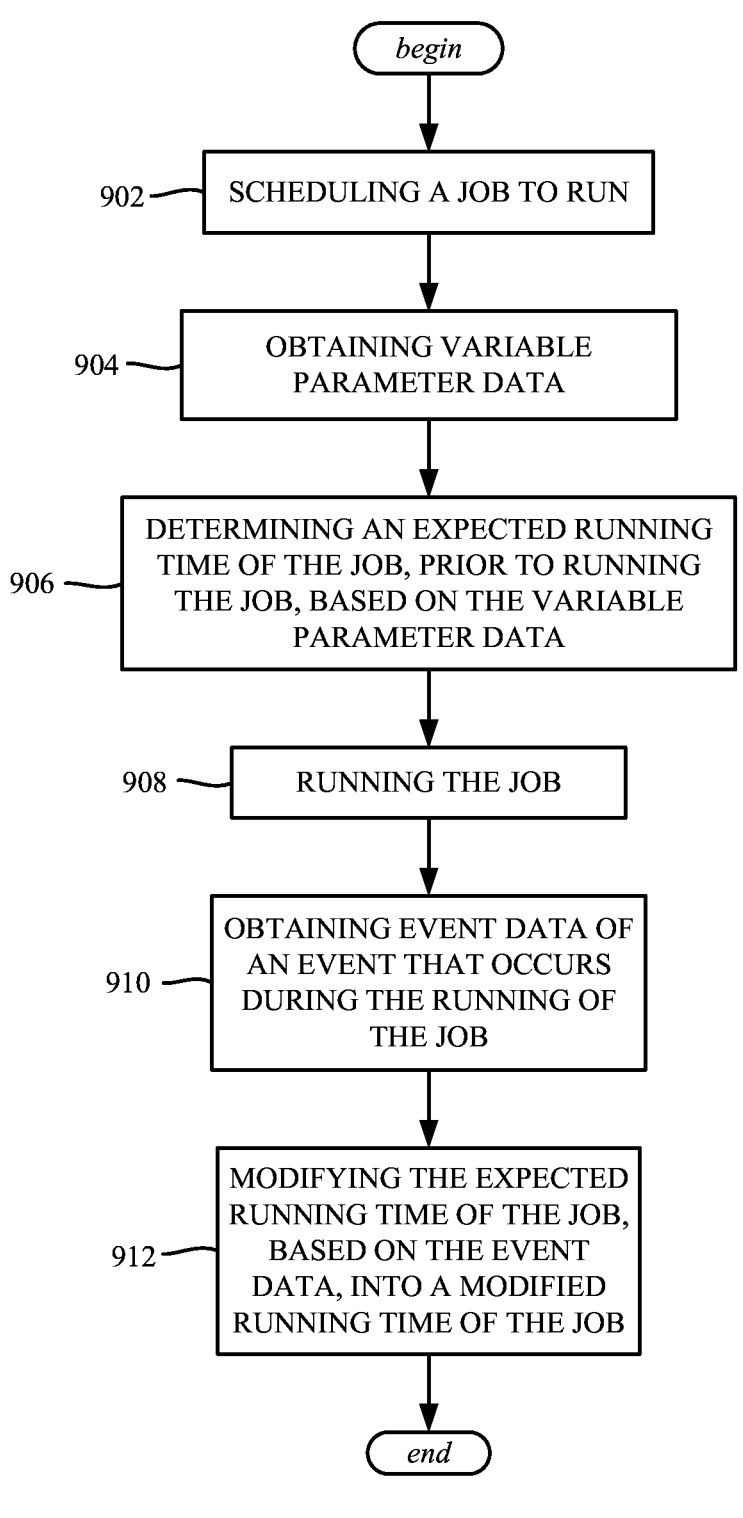
FIG. 9 is a flow diagram showing example operations related to modifying expected running time of a job based on event data of events that occur while running the job, in accordance with various aspects and implementations of the subject disclosure.

FIG. 9 summarizes various example operations, e.g., corresponding to a machine-readable medium, comprising executable instructions that, when executed by a processor, facilitate performance of operations. Example operation 902 represents scheduling a job to run. Example operation 904 represents obtaining variable parameter data. Example operation 906 represents determining an expected running time of the job, prior to running the job, based on the variable parameter data. Example operation 908 represents running the job. Example operation 910 represents obtaining event data of an event that occurs during the running of the job. Example operation 912 represents modifying the expected running time of the job, based on the event data, into a modified running time of the job.

The job can be a first job, and further operations can include modifying scheduling of a second job based on the modified running time of the first job.

As can be seen, the technology described herein facilitates generation of an efficient backup or other type of job schedule, e.g., algorithmically, based on input provided by an administrator. The technology described herein notifies the administrator ahead of possible failing jobs. As a result, possible data loss and monetary costs, which are otherwise incurred today by solutions that only alert post-operation/failure, can be prevented. Note that with existing systems, administrators typically create extra data copies and keep them longer to make sure SLA requirements are met; this is because job failures are detected only after the fact, often too late to run again, and administrators need to be cautious and overly protect assets, which wastes resources.

Further, the technology described herein considers real-time events and can adjust the running time of a job or jobs based thereon. The ability to detect asset inactivity can be used to host jobs even during peak hours to free up resources that ordinarily rely on the traditional off-peak/non-hosting windows of operation. As a result, the limitation of narrow job running windows can be scaled to meet the ever-growing amount of data that needs to be protected or otherwise handled.

In sum, the most complex and error-prone tasks of an administrator are significantly reduced or even eliminated by the technology described herein, which helps to optimize the job success rate. Both end user experience and enterprises benefit from this approach. Furthermore, the system can improve over time, as feeding back the success/failure of jobs into a model will further optimize the job success rate as more results data are available for analysis.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
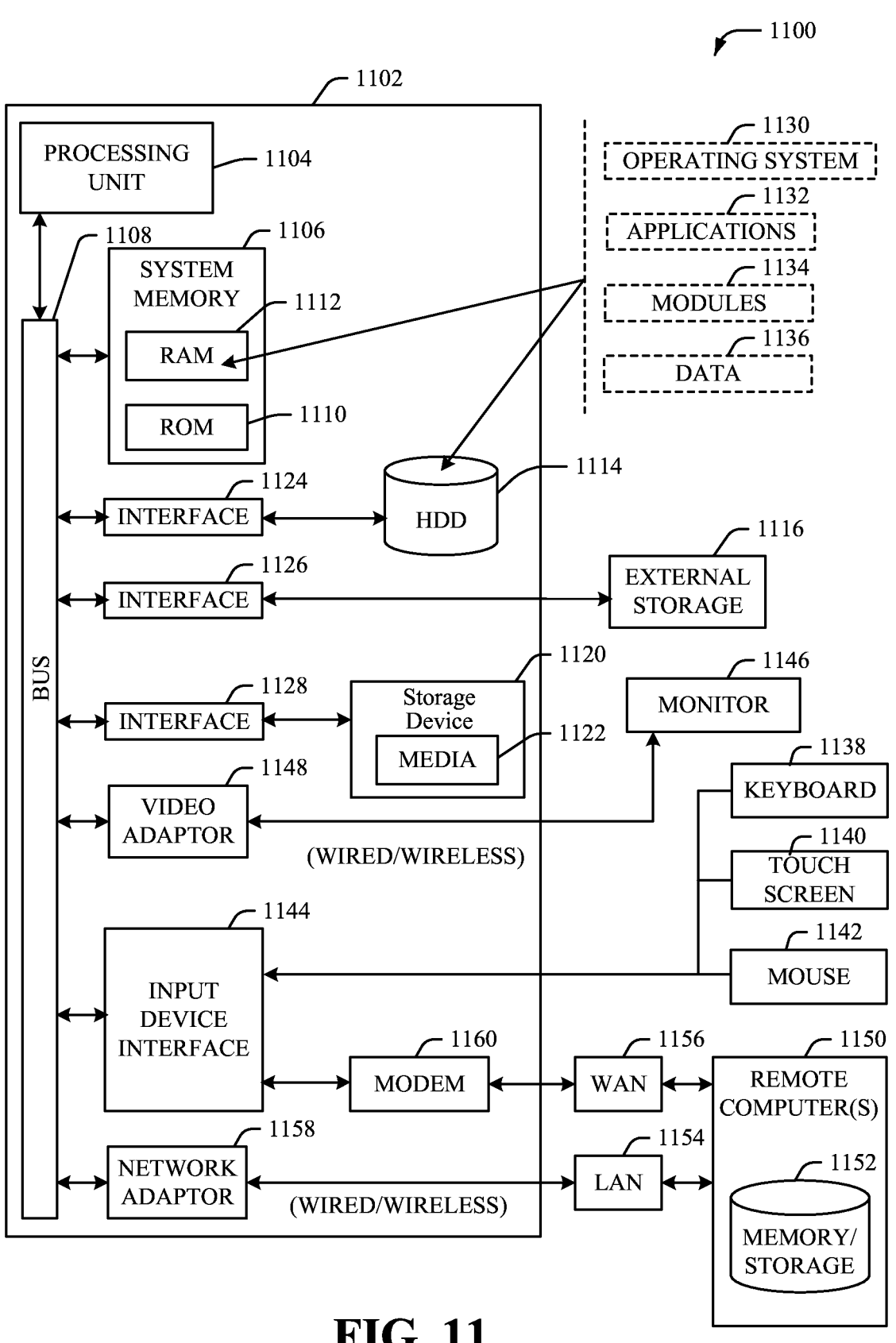
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (virtual machine) of multiple virtual machines hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
at least one processor; and
at least one memory that stores executable instructions that, when executed by the at least one processor, facilitate performance of operations, the operations comprising:
scheduling running of a first job based on static parameter data;
obtaining first variable parameter data;
evaluating the first job, prior to the running of the first job, based on the first variable parameter data;
in response to the evaluating of the first job, taking a first action to remediate the first job into a first adjusted job;
running the first adjusted job;
scheduling a second job based on the static parameter data;
obtaining second variable parameter data;
evaluating the second job, prior to running the second job, based on the second variable parameter data; and
in response to the evaluating of the second job, rescheduling the running of the second job.

2. The system of claim 1, wherein the taking of the action to remediate the first job into the first adjusted job is performed based on result data determined by an analytics engine.

3. The system of claim 1, wherein the operations further comprise obtaining job execution information with respect to the running of the first adjusted job, and providing the job execution information to a model to increase a success rate of job execution.

4. The system of claim 1, wherein at least one of the first variable parameter data or the second variable parameter data comprises at least one of: dynamic parameter data, environmental parameter data, or event-based parameter data.

5. The system of claim 1, wherein at least one of the first variable parameter data or the second variable parameter data comprises at least one of: asset-related data, storage capacity data, power data, network condition data, maintenance data, or disaster-related data.

6. The system of claim 1, wherein at least one of the first variable parameter data or the second variable parameter data comprises at least one of: an amount of data to be processed, network bandwidth data, system health data, system load condition data, or asset availability data.

7. The system of claim 1, wherein at least one of the first variable parameter data or the second variable parameter data comprises at least one of: hosting performance limit data of an asset, natural event data, or datacenter condition data.

8. The system of claim 1, wherein at least one of the first variable parameter data or the second variable parameter data comprises at least one of: schedule-based data or calendar data.

9. The system of claim 1, wherein the first job comprises a data backup job, and wherein the static parameter data comprises at least one of: backup frequency data, backup type data, number of backup copies data, priority information of data to back up, service level agreement data, or service level objective data.

10. The system of claim 1, wherein the operations further comprise:

in response to the evaluating of the second job, outputting an alert prior to the running of the second job.

11. The system of claim 10, wherein the operations further comprise:

receiving information in response to the outputting of the alert;

in response to the receiving of the information, taking a second action based on the information to remediate the second job into a second adjusted job prior to the running of the second job; and running the second adjusted job as the second job.

12. The system of claim 1, wherein the operations further comprise:

in response to the evaluating of the second job, adjusting a running time associated with the running of the second job.

13. A method, comprising:

scheduling, by a system comprising at least one processor, running of a first job based on static parameter data;

obtaining, by the system, first variable parameter data;

evaluating, by the system, the first job, prior to the running of the first job, based on the first variable parameter data;

in response to the evaluating of the first job, taking, by the system, action to remediate the job into a first adjusted job;

running, by the system, the first adjusted job;

scheduling, by the system, a second job based on the static parameter data;

obtaining, by the system, second variable parameter data;

evaluating, by the system, the second job, prior to running the second job, based on the second variable parameter data; and in response to the evaluating of the second job, outputting, by the system, an alert prior to the running of the second job.

14. The method of claim 13, further comprising:

receiving, by the system, information in response to the outputting of the alert;

in response to the receiving of the information, taking, by the system, action based on the information to remediate the second job into a second adjusted job prior to the running of the second job; and running, by the system, the second adjusted job as the second job.

15. The method of claim 13, further comprising:

in response to the evaluating of the second job, rescheduling, by the system, the running of the second job.

16. The method of claim 13, further comprising:

in response to the evaluating of the second job, adjusting a running time associated with the running of the second job.

17. A non-transitory machine-readable medium, comprising executable instructions that, when executed by at least one processor, facilitate performance of operations, the operations comprising:

scheduling running of a job based on static parameter data;

obtaining first variable parameter data;

evaluating, by the system, the job, prior to the running of the job, based on the first variable parameter data;

in response to the evaluating of the job, taking a first action to remediate the job into an adjusted job;

running the adjusted job, wherein the adjusted job is a first job;

scheduling a second job based on the static parameter data;

obtaining second variable parameter data;

evaluating the second job, prior to running the second job, based on the second variable parameter data; and in response to the evaluating of the second job, adjusting a running time associated with the running of the second job.

18. The non-transitory machine-readable medium of claim 17, wherein the operations further comprise:

in response to the evaluating of the second job, outputting an alert prior to the running of the second job.

19. The non-transitory machine-readable medium of claim 18, wherein the operations further comprise:

receiving information in response to the outputting of the alert;

in response to the receiving of the information, taking a second action based on the information to remediate the second job into a second adjusted job prior to the running of the second job; and running the second adjusted job as the second job.

20. The non-transitory machine-readable medium of claim 17, wherein the operations further comprise:

in response to the evaluating of the second job, rescheduling, by the system, the running of the second job.

* * * * *